(12) United States Patent
Childress et al.

(10) Patent No.: US 10,875,707 B2
(45) Date of Patent: Dec. 29, 2020

(54) TRASH COMPACTOR SYSTEMS AND METHODS

(71) Applicant: THE BOEING COMPANY, Chicago, IL (US)

(72) Inventors: Jamie J. Childress, Mercer Island, WA (US); Daniel Joseph Perron, Federal Way, WA (US)

(73) Assignee: THE BOEING COMPANY, Chicago, IL (US)

(*) Notice: Subject to any disclaimer, the term of this patent is extended or adjusted under 35 U.S.C. 154(b) by 389 days.

(21) Appl. No.: 15/839,300

(22) Filed: Dec. 12, 2017

(65) Prior Publication Data

US 2019/0177083 A1   Jun. 13, 2019

(51) Int. Cl.
*B30B 9/30* (2006.01)
*B30B 15/00* (2006.01)
(Continued)

(52) U.S. Cl.
CPC ............ *B65F 1/1405* (2013.01); *B30B 9/301* (2013.01); *B30B 9/3046* (2013.01); *B30B 9/3053* (2013.01); *B30B 15/007* (2013.01); *B30B 15/165* (2013.01); *B64D 11/02* (2013.01); *B65F 1/141* (2013.01); *B65F 1/1431* (2013.01);
(Continued)

(58) Field of Classification Search
CPC ... B30B 9/3053; B30B 9/3046; B30B 15/165; B30B 15/007; B30B 9/301; B30B 1/04; B65F 1/163; B65F 1/1405; B65F 1/1431; B65F 1/141; B65F 2210/12; B65F 1/105; B64D 11/02
See application file for complete search history.

(56) References Cited

U.S. PATENT DOCUMENTS 2,968,235 A * 1/1961 Marica ...................... B02C 1/00
100/218
3,357,346 A * 12/1967 Carl-Gustaf .......... B65F 1/1405
100/226
(Continued)

FOREIGN PATENT DOCUMENTS

CN      201284093      8/2009
CN      202923003      5/2013
(Continued)

OTHER PUBLICATIONS

U.S. Appl. No. 15/183,957 (not published as of Dec. 12, 2017).
Extended European Search Report for EP 18207577.0-1019, dated Apr. 26, 2019.

Primary Examiner — Jimmy T Nguyen
(74) Attorney, Agent, or Firm — The Small Patent Law Group LLC; Joseph M. Butscher

(57) ABSTRACT

A trash compactor system includes a receptacle defining a retaining chamber that is configured to receive and retain trash, a compaction plate moveably secured within the retaining chamber, and a foot pedal operatively coupled to the compaction plate. Engagement of the foot pedal moves the compaction plate within the retaining chamber to compact the trash retained within the retaining chamber. A flap may cover an opening into the retaining chamber. The foot pedal may also be operatively coupled to the flap, such that the engagement of the foot pedal moves the flap into an open position that exposes the opening.

20 Claims, 7 Drawing Sheets

(51) Int. Cl.
 B30B 15/16 (2006.01)
 B65F 1/14 (2006.01)
 B64D 11/02 (2006.01)
 B65F 1/10 (2006.01)
 B30B 1/04 (2006.01)

(52) U.S. Cl.
 CPC .............. *B30B 1/04* (2013.01); *B65F 1/105* (2013.01); *B65F 2210/12* (2013.01)

(56) References Cited

U.S. PATENT DOCUMENTS

| | | | | |
|---|---|---|---|---|
| 4,788,909 | A | * 12/1988 | Stewart | ............... A47K 10/24 100/102 |
| 5,884,556 | A | 3/1999 | Klepacki | |
| 7,191,701 | B2 | 3/2007 | Fukuizumi | |
| 8,776,680 | B2 | 7/2014 | Zimmerman | |
| 9,415,873 | B2 | 8/2016 | McIntosh | |
| 2004/0163170 | A1* | 8/2004 | Cooper | ............... B64D 11/02 4/664 |
| 2005/0257698 | A1* | 11/2005 | Fukuizumi | ............ B30B 9/3053 100/233 |
| 2009/0038437 | A1 | 2/2009 | Huang | |
| 2009/0095831 | A1* | 4/2009 | Huang | ............... B02C 18/0007 241/101.5 |
| 2012/0137902 | A1 | 6/2012 | Cunningham | |

FOREIGN PATENT DOCUMENTS

| | | |
|---|---|---|
| EP | 0927686 | 7/1999 |
| FR | 3008962 | 1/2015 |
| FR | 3008963 | 1/2015 |
| GB | 2461889 | 1/2010 |

\* cited by examiner

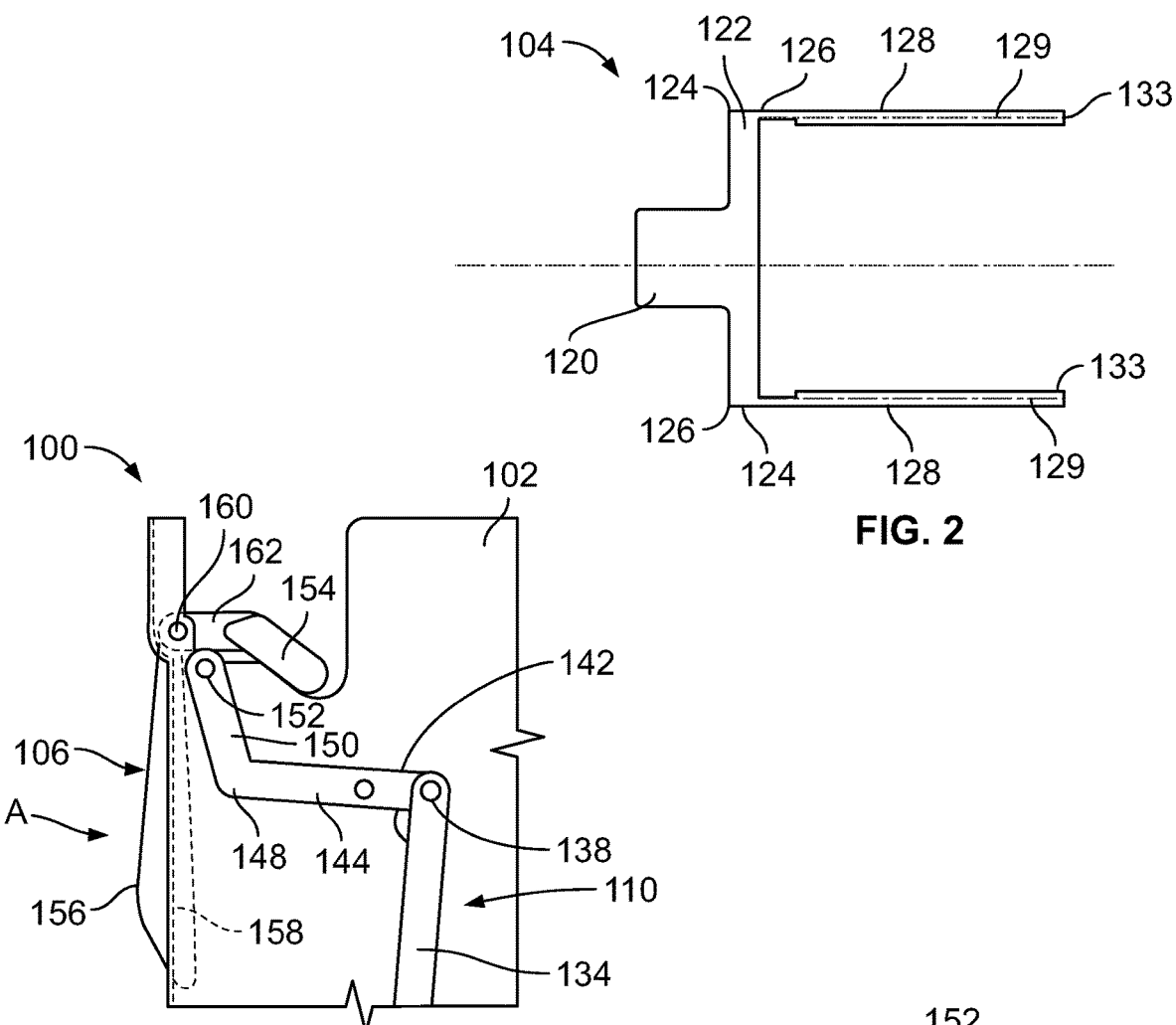
FIG. 2
FIG. 3
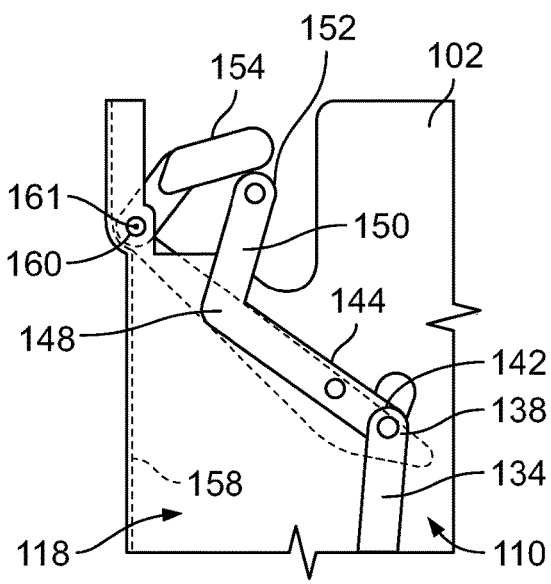
FIG. 4

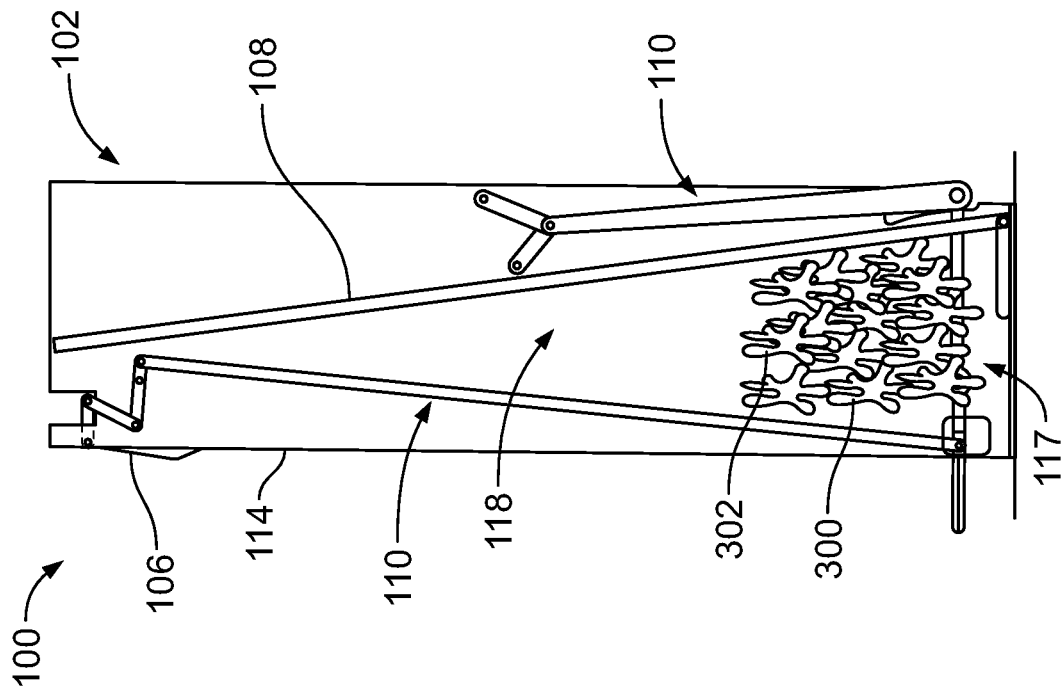
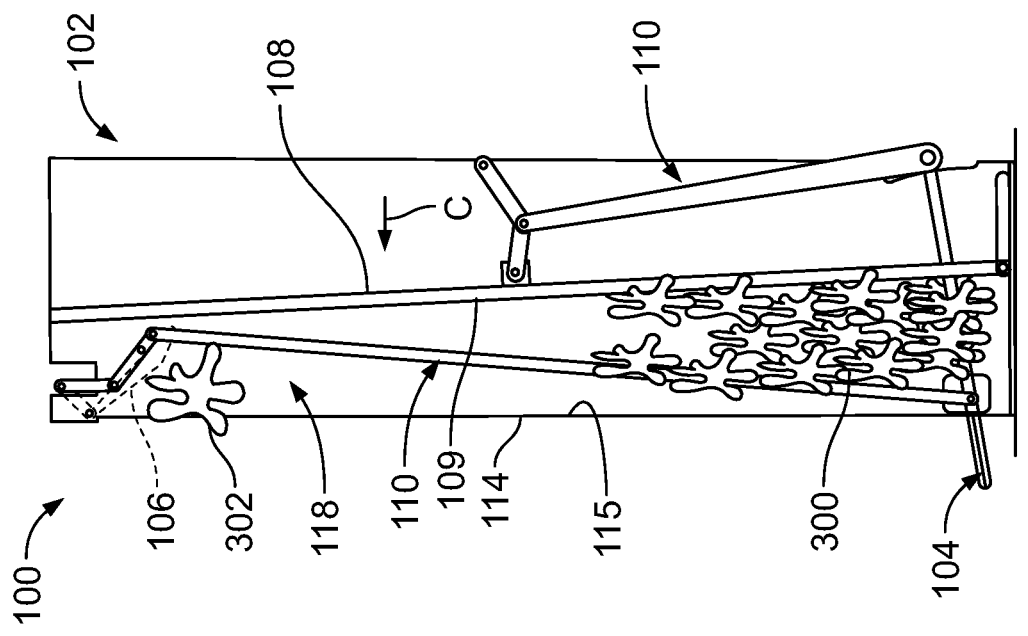

US 10,875,707 B2

TRASH COMPACTOR SYSTEMS AND METHODS

FIELD OF THE DISCLOSURE

Embodiments of the present disclosure generally relate to trash compactor systems and methods, such as may be used within a lavatory of a commercial aircraft.

BACKGROUND OF THE DISCLOSURE

Commercial aircraft are used to transport passengers between various locations. A typical commercial aircraft includes one or more lavatories within an internal cabin.

A lavatory within an internal cabin includes a toilet, sink, and a trash container. Used paper towels, facial tissues, and the like may be disposed of within the trash container.

A typical trash container within a lavatory of a commercial aircraft has a limited volume. In particular, the volume of a known trash container used within an aircraft lavatory has a volume of approximately one cubic foot. As can be appreciated, during a flight, the trash container may be quickly filled. Indeed, during particularly long flights, the trash container may fill to the point of overflowing, thereby requiring flight staff to empty the contents of the trash container into another holding container, trash bags, and/or the like.

An aircraft may include a powered compactor within a galley. The compactor typically includes a motor that is used to effect compaction. However, such a compactor is large and heavy, and is used to compact relatively dense trash, including beverage cans, food containers, and/or the like. Typical compactors within a galley of an aircraft are generally too large to fit within the confined space of a lavatory.

In general, the lavatories onboard commercial aircraft do not include any trash compactor. As such, flight staff sometimes manually compact trash with their hands (for example, by pushing down on the trash with their hands) in order to provide a trash container with increased capacity to accept trash.

SUMMARY OF THE DISCLOSURE

A need exists for a compact and efficient trash compactor system and method. Further, a need exists for a trash compactor system that may be employed within a lavatory of a commercial aircraft.

With those needs in mind, certain embodiments of the present disclosure provide a trash compactor system that includes a receptacle defining a retaining chamber that is configured to receive and retain trash, a compaction plate moveably secured within the retaining chamber, and a foot pedal operatively coupled to the compaction plate. Engagement of the foot pedal moves the compaction plate within the retaining chamber to compact the trash retained within the retaining chamber. A linkage assembly may operatively couple the foot pedal to the compaction plate.

The trash compactor system may also include a flap covering an opening into the retaining chamber. The foot pedal may also be operatively coupled to the flap. Accordingly, the engagement of the foot pedal may move the flap into an open position that exposes the opening. A linkage assembly may operatively couple the foot pedal to the flap. In at least one embodiment, the engagement of the foot pedal causes simultaneous motion of the compaction plate and the flap.

The receptacle may include a front wall and lateral walls upwardly extending from a base. The retaining chamber may be defined between the base, the front wall, and the lateral walls.

The compaction plate moves from a rear towards a front of the receptacle to compact the trash retained within the retaining chamber. The compaction plate includes a bottom end and a top end. The compaction plate may be inwardly canted from the bottom end to the top end towards a front of the receptacle.

The compaction plate is manually powered via the foot pedal. For example, a single press of the foot pedal causes the compaction plate to compact the trash within the retaining chamber. In at least one embodiment, the trash compactor system is devoid of a motor.

Certain embodiments of the present disclosure provide a trash compacting method that includes defining a retaining chamber that is configured to receive and retain trash within a receptacle, moveably securing a compaction plate within the retaining chamber, operatively coupling a foot pedal to the compaction plate, moving the compaction plate within the retaining chamber via engagement of the foot pedal, and compacting the trash retained within the retaining chamber through the moving operation.

Certain embodiments of the present disclosure provide a vehicle that includes an internal cabin, a lavatory within the internal cabin, and a trash compactor system within the lavatory.

BRIEF DESCRIPTION OF THE DRAWINGS

FIG. 2 illustrates a top view of a foot pedal, according to an embodiment of the present disclosure.

FIG. 3 illustrates a lateral view of a flap of a trash compactor system in a closed position, according to an embodiment of the present disclosure.

FIG. 4 illustrates a lateral view of a flap of a trash compactor system in an open position, according to an embodiment of the present disclosure.

FIG. 7 illustrates a lateral view of a trash compactor system in an actuated state in which trash is compacted, according to an embodiment of the present disclosure.

FIG. 8 illustrates a lateral view of a trash compactor system in an at-rest state in which trash is at a bottom of a retaining chamber of a receptacle, according to an embodiment of the present disclosure.

DETAILED DESCRIPTION OF THE DISCLOSURE

Figure 1:
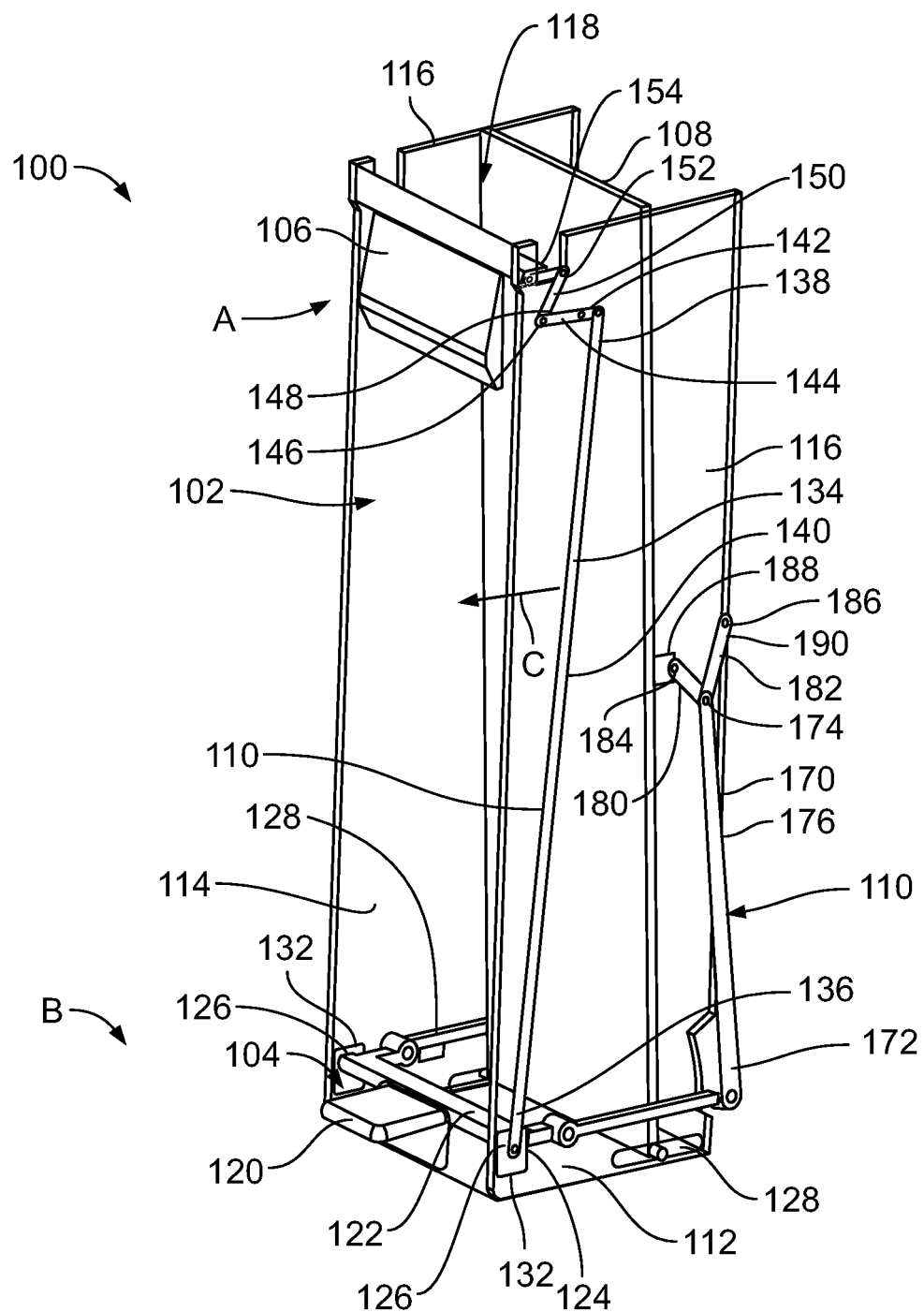
FIG. 1 illustrates a perspective view of a trash compactor system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide a trash compactor system and method, which may be used within a lavatory of a vehicle, such as a commercial aircraft. The trash compactor system may be configured to fit in the same space as an existing lavatory trash can. Trash within the trash compactor system is compacted each time a foot pedal is pressed. After each compaction cycle, trash falls to the bottom of a receptacle. Trash at the bottom of the receptacle is further compacted with each subsequent compaction cycle.

Due to the low density of crumpled paper towel waste, a volume reduction in paper towels of more than 300% may be possible due to the embodiments of the present disclosure, even with only a 30% compaction for each cycle. Because trash in a lavatory within an internal cabin of an aircraft primarily includes paper towels, even a modest compaction force greatly compacts the trash, thereby increasing the available space for additional trash.

The trash compactor system provides compaction each time an individual pushes on the foot pedal to open a trash flap door that is coupled to the foot pedal, such through a linkage assembly. The compaction is manually powered through operation of the foot pedal, instead of through a motor, for example. That is, by using the foot pedal to open a flap door of coupled to the receptacle, the individual provides the energy for compaction. The individual may simultaneously open the receptacle via the flap door and compact trash therein by pressing the foot pedal.

Embodiments of the present disclosure provide trash compactor systems and methods that compact lightweight non-rigid articles (for example, paper towels) by using energy exerted by an individual into a foot pedal. The foot pedal causes a flap to open, which allows the individual to dispose of trash within a retaining chamber of a receptacle. As such, the trash compactor systems and method do not require electrical power to operate.

In at least one embodiment, a trash compactor system includes a receptacle having a pivotally attached foot pedal at a bottom end, and an opening for receiving the articles distally located from the bottom end (such as proximate to a top end). A linkage assembly couples a compaction plate to the foot pedal such that actuation of the foot pedal causes the compaction plate to move toward the opening to compact trash within the receptacle.

FIG. 1 illustrates a perspective view of a trash compactor system 100, according to an embodiment of the present disclosure. The trash compactor system 100 includes a receptacle 102, and a foot pedal 104 operatively coupled to a flap 106 and a compaction plate 108 within the receptacle 102, such as through a linkage assembly 110, which may include a plurality of link beams (such as arms, brackets, straps, panels, and/or the like) that operatively couple the foot pedal 104 to both the flap 106 and the compaction plate 108. In at least one embodiment, the linkage assembly 110 may include one or more gears, hydraulics, valves, pneumatics, and/or the like in addition to, or in place of link beams. For example, the linkage assembly may include a valve coupled to the foot pedal 104. Actuation of the foot pedal 104 operates the valve to control the compaction plate 108, such as through changes in air pressure and/or pneumatic force.

As described herein, the trash compactor system 100 includes the foot pedal 104, which is operatively coupled to the compaction plate 108. Engagement of the foot pedal 104 (such as by an individual stepping on the foot pedal 104) causes the compaction plate 108 to move within the receptacle 102 to compact trash contained therein. The foot pedal 104 may also be operatively coupled to the flap 106. Engagement of the foot pedal 104 may also cause the flap 106 to open, so that trash may be deposited into the receptacle 102. Engagement of the foot pedal 104 may cause simultaneous motion of both the compaction plate 108 and the flap 106.

For the sake of clarity, the receptacle 102 is shown with transparent wall portions so that internal components of the trash compactor system 100 are shown. The receptacle 102 may include opaque walls, transparent walls, and/or semi-transparent walls. The receptacle 102 includes a base 112 connected to a front wall 114 and opposed lateral walls 116. While not shown, the receptacle 102 may also include a rear wall opposite from the front wall 114, and a top cover opposite from the base 112. The front wall 114 and the lateral walls 116 may orthogonally and upwardly extend from the base 112. The receptacle 102 may be shaped as a rectangular box. Optionally, the receptacle 102 may be shaped as a cylinder. A retaining chamber 118 is defined between the base 112, the front wall 114, and the lateral walls 116 (and optionally the rear wall and the top cover). The compaction plate 108 is moveably positioned within the retaining chamber 118.

FIG. 2 illustrates a top view of the foot pedal 104, according to an embodiment of the present disclosure. Referring to FIGS. 1 and 2, the foot pedal 104 includes an engagement panel 120 outwardly extending (that is, away from the retaining chamber 118) from a cross bar 122. The engagement panel 120 may outwardly extend from a central portion of the cross bar 122. The foot pedal 104 provides a lever that is operatively coupled to the flap 106 and the compaction plate 108 via the linkage assembly 110. Alternatively, the foot pedal 104 may only be operatively coupled to the compaction plate 108, but not the flap 106.

The cross bar 122 includes link couplers 124 at ends 126. The link couplers 124 may be or otherwise include a pivot rod and/or pivot pins that are configured to extend into reciprocal channels of a portion of the linkage assembly 110. Optionally, the link couplers 124 may be receptacles that are configured to receive a pivot rod and/or pivot pins of the linkage assembly 110. Prongs 128 extend inwardly from the ends 126 away from the engagement panel 120. The prongs 128 may be linear beams having longitudinal axes 129 that are parallel to one another and to a main longitudinal axis 130 of the foot pedal 104. As shown in FIG. 2, the foot pedal 104 may be symmetrical with respect to the main longitudinal axis 130.

Referring again to FIG. 1, the ends 126 of the foot pedal 104 extend into openings 132 formed in the lateral walls 114 proximate to the front wall 114 and the base 112. Each end 126 may be pivotally coupled to a linear flap actuating link beam 134 of the linkage assembly 110. Optionally, only one end 126 may be connected to the flap actuating link beam 134. The flap actuating link beam(s) 134 may extend over an outer surface of the lateral wall(s) 116. As such, trash within the retaining chamber 118 does not interfere with the link beam(s) 134. Alternatively, the end(s) 126 may be pivotally coupled to the flap actuating link beam(s) 134 within the receptacle 102, such that the flap actuating link beam(s) 134 may extend over inner surfaces of the lateral wall(s) 116. The flap actuating link beam(s) 134 may be a straight beam having a bottom end 136 that connects to a top end 138 through a linear main body 140. As shown, the main body 140 angles away from the front wall 114 of the receptacle 102 from the bottom end 136 to the top end 138.

The top end 138 of the flap actuating link beam 134 is pivotally coupled to an inner end 142 of a cross link beam 144, which inwardly extends towards the front wall 114. The cross link beam 144 includes an opposite end 146 that connects (for example, pivotally couples) to a bottom end 148 of a flap link beam 150, which includes an top end 152 that extends into a channel proximate to a lip 154 of the flap 106.

FIG. 3 illustrates a lateral view of the flap 106 of the trash compactor system 100 in a closed position, according to an embodiment of the present disclosure. The flap 106 includes a front door 156 that covers an upper opening 158 formed through the front wall 114 of the receptacle 102. The front door 156 is pivotally coupled to the front wall 114, such as through a hinge 160. In a non-actuated position (such as when no pressure is exerted onto the engagement panel 120 of the foot pedal 104, shown in FIGS. 1 and 2), the top end 152 of the flap link beam 150 may be positioned within the channel 162 between the hinge 160 and the lip 154 of the flap 106. As such, an individual may push the front door 156 of the flap 106 inwardly in the direction of arc A, so that the flap 106 pivots into an open position without the linkage assembly 110 being actuated. That is, an individual may open the flap 106 by hand without actuating the compaction plate 108 via the linkage assembly 110.

FIG. 4 illustrates a lateral view of the flap 106 of the trash compactor system 100 in an open position, according to an embodiment of the present disclosure. Referring to FIGS. 1, 2, and 4, when the engagement panel 120 of the foot pedal 104 is downwardly pressed in the direction of arc B, the foot pedal 104 operates as a lever to actuate the linkage assembly 110, thereby urging the top end 152 of the flap link beam 150 into the lip 154, which causes the flap 106 to open about a pivot axis 161 of the hinge 160. In this manner, the front door 156 of the flap 106 opens to expose the opening 158. Accordingly, an individual may press the foot pedal 104 with a foot to open the flap 106 so that the trash may be placed into the retaining chamber 118 (instead of using a hand to open the flap 106). As described below, operation of the foot pedal 104 in this manner also causes the compaction plate 108 to move and compact trash within the retaining chamber 118. In at least one embodiment, a single press of the foot pedal 104 causes the compaction plate 108 to move and compact the trash within the retaining chamber 118. For example, a single actuation of the foot pedal 104, such as through a single foot press on the engagement panel 104 (in contrast to repeated pumping, for example) causes the compaction plate 108 to move and compact the trash within the retaining chamber 118.

Referring again to FIGS. 1 and 2, distal ends 133 of one or both of the prongs 128 of the foot pedal 104 are pivotally coupled to a compaction actuating link beam 170 of the linkage assembly 110. The compaction actuating link beam 170 includes a bottom end 172 pivotally coupled to the distal end 133 of the prong 128. The bottom end 172 of the compaction actuating link beam 170 connects to a top end 174 through a linear main body 176. The top end 174 is pivotally coupled to bottom ends of a front-directed beam 180 and a rear-directed beam 182. The front-directed beam 180 has a top end 184 pivotally coupled to a tab 188 rearwardly extending from a rear surface of the compaction plate 108. The rear-directed beam 182 includes a top end 190 that is pivotally fixed to a portion 186 of the receptacle 102, such as a portion of a lateral wall 116.

In operation, as the engagement panel 120 of the foot pedal 104 is pressed downwardly in the direction of arc B, the linkage assembly 110 is actuated to open the flap 106, as described above. Further, as the engagement panel 120 is pressed downwardly in the direction of arc B, the linkage assembly 110 also urges the compaction plate 108 forward towards the front wall 114 in the direction of arrow C to compact trash within the retaining chamber 118.

Figure 5:
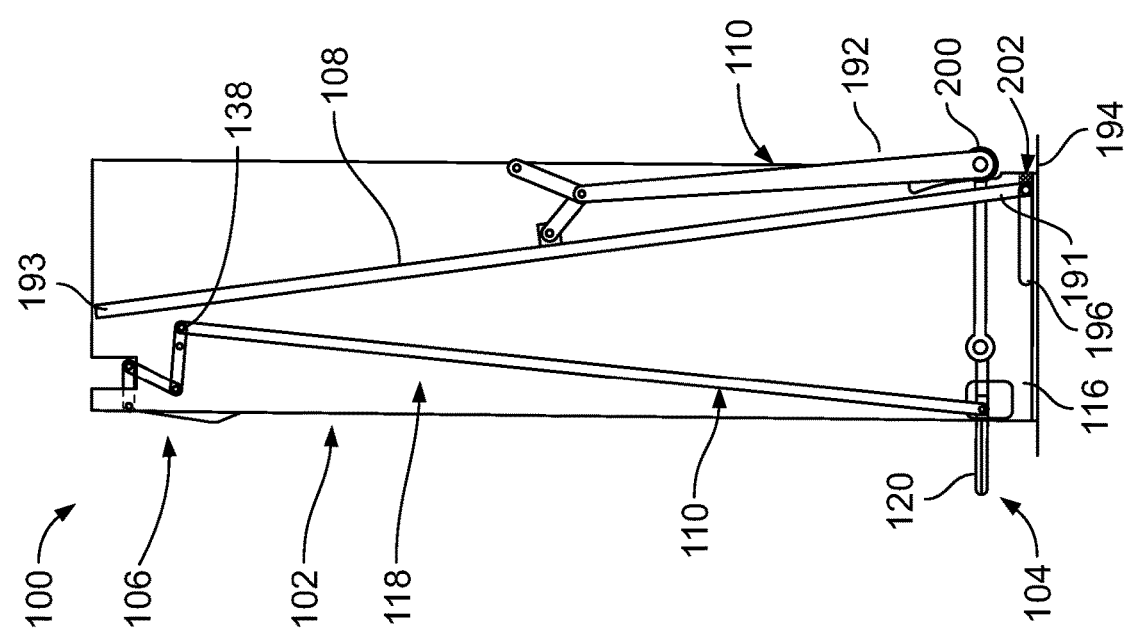
FIG. 5 illustrates a lateral view of a trash compactor system in an at-rest state, according to an embodiment of the present disclosure.

FIG. 5 illustrates a lateral view of the trash compactor system 100 in an at-rest state, according to an embodiment of the present disclosure. In the at-rest state, the foot pedal 104 is not pressed or otherwise engaged. In particular, the engagement panel 120 is not pressed down. The trash compactor system 100 may include one or more spring members 200 and 202 (such as coil springs, helical springs, and/or the like) that spring-bias the linkage assembly 110, the compaction plate 108, and/or the foot pedal 104 into the at-rest state. In the at-rest state, the flap 106 is closed, and a bottom end 191 of the compaction plate 108 is positioned proximate a rear 192 of the receptacle 102. The compaction plate 108 may be inwardly canted towards the front wall 114 from the bottom end 191 towards a top end 193. The inward cant of the compaction plate 108 compacts and forces trash downwardly as the compaction plate 108 is moved inwardly towards the front wall 114. Optionally, the compaction plate 108 may not be inwardly-canted.

As shown, the compaction plate 108 may include protuberances 194 (such as pins, studs, posts, nubs, or the like) that are retained within a track 196 formed in the lateral wall 116. The track 196 limits the range of motion of the protuberances 194 therein, and therefore the range of motion of the compaction plate 108 within the retaining chamber 118. The tracks 196 may be shorter or longer than shown. In at least one embodiment, the lateral wall(s) 116 may not include the tracks, and the compaction plate 108 may not include the protuberances 194.

Figure 6:
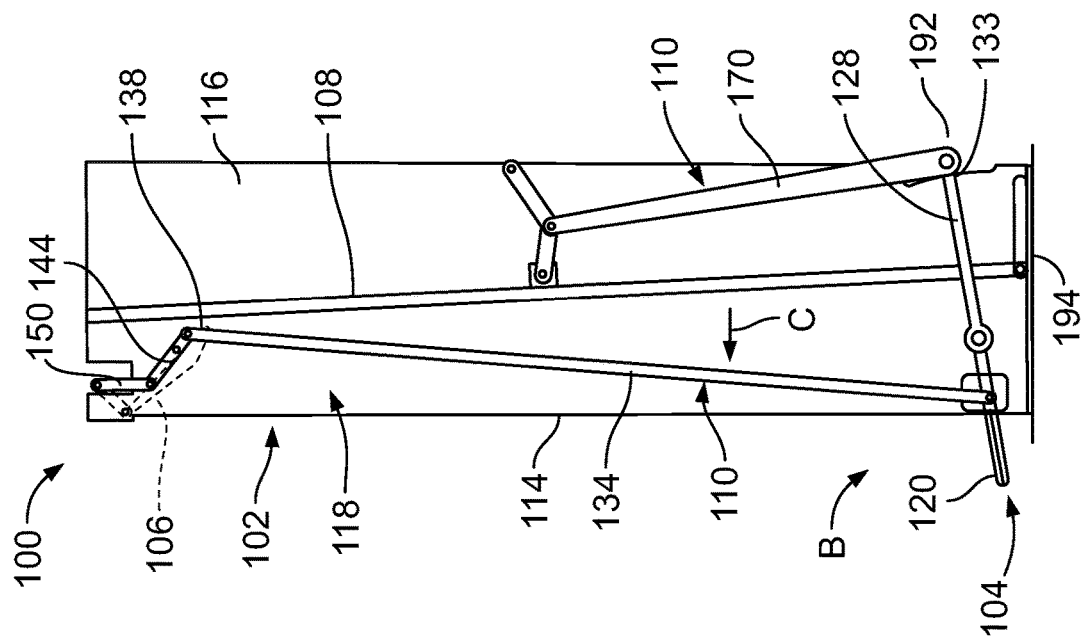
FIG. 6 illustrates a lateral view of a trash compactor system in an actuated state, according to an embodiment of the present disclosure.

FIG. 6 illustrates a lateral view of the trash compactor system 100 in an actuated state, according to an embodiment of the present disclosure. In the actuated state, the flap 106 is opened, and the compaction plate 108 is moved in the retaining chamber 118 toward the front wall 114 of the receptacle 102. As the engagement panel 120 of the foot pedal 104 is pressed downwardly in the direction of arc B, the flap actuating link beam 134 is pulled down, thereby extending the cross link beam 144 and the flap link beam 150 to open the flap 106, as described above. At the same time, the distal ends 133 of the prongs 128 of the foot pedal 104 are upwardly pivoted, which forces the compaction actuating link beam 170 up, thereby spreading apart the front-directed beam 180 and the rear-directed beam 182 towards a linear alignment (in that the beams 180 and 182 are moved towards a linear alignment), which, in turn, forces the compaction plate 108 forward in the direction of arrow C within the retaining chamber 118. After pressure is released from the engagement panel 120 of the foot pedal 104, the linkage assembly 110 returns the trash compactor system 100 into the at-rest state, as shown in FIG. 5, which may be aided by the spring member 200 and 202, for example.

The compaction plate 108 is moved from rear to front to compact trash within the retaining chamber 118, instead of from top to bottom. As described, the compaction plate 108 is actuated manually via operation of the foot pedal 104 and the linkage assembly 110. As such, the trash compactor system 100 is able to compact trash within the retaining chamber 118 without the use of a motor or separate power source. Indeed, the trash compactor system 100 may be wholly devoid of a motor or a separate power source. The trash compactor system 100 may be devoid of electrical power. The trash compactor system 100 may be operated solely through manual force. Therefore, the trash compactor system 100 is light and compact, as compared to trash compactors that include motors and which are coupled to separate sources of power.

The linkage assembly 110 may include more or less link beams than those shown. Further, certain link beams may be fixed with respect to one another, as opposed to being pivotally coupled. As an example, the beams 144 and 150 may be fixed together, instead of being pivotally coupled to one another. In at least one embodiment, the linkage assembly 110 may include the flap actuating link beam 134 directly coupled to the foot pedal 104 and the flap 106 without the intermediate beams 144 and 150. In at least one embodiment, the linkage assembly 110 may include the compaction actuating link beam 170 directly coupled to the foot pedal 104 and the compaction plate 108 without the intermediate beams 180 and 182. In at least one other embodiment, the linkage assembly 110 may include link beams in addition to those shown.

FIG. 7 illustrates a lateral view of the trash compactor system 100 in the actuated state in which trash 300 is compacted, according to an embodiment of the present disclosure. As the foot pedal 104 is engaged by an individual, the linkage assembly 110 opens the flap 106 (so that additional trash 302 may be placed in the retaining chamber 118), and moves the compaction plate 108 towards the front wall 114 in the direction of arrow C, to compress and compact the trash 300 between the front face 109 of the compaction plate 108 and a rear surface 115 of the front wall 114.

FIG. 8 illustrates a lateral view of a trash compactor system 100 in the at-rest state in which the trash 300 and 302 is at the bottom 117 of the retaining chamber 118 of the receptacle 102, according to an embodiment of the present disclosure. As the compaction plate 108 moves back away from the front wall 114 of the receptacle 102, the compacted trash 300 and 302 falls to the bottom of the 117 of the retaining chamber 118, thereby providing additional open space within the retaining chamber 118 for additional trash.

Figure 9:
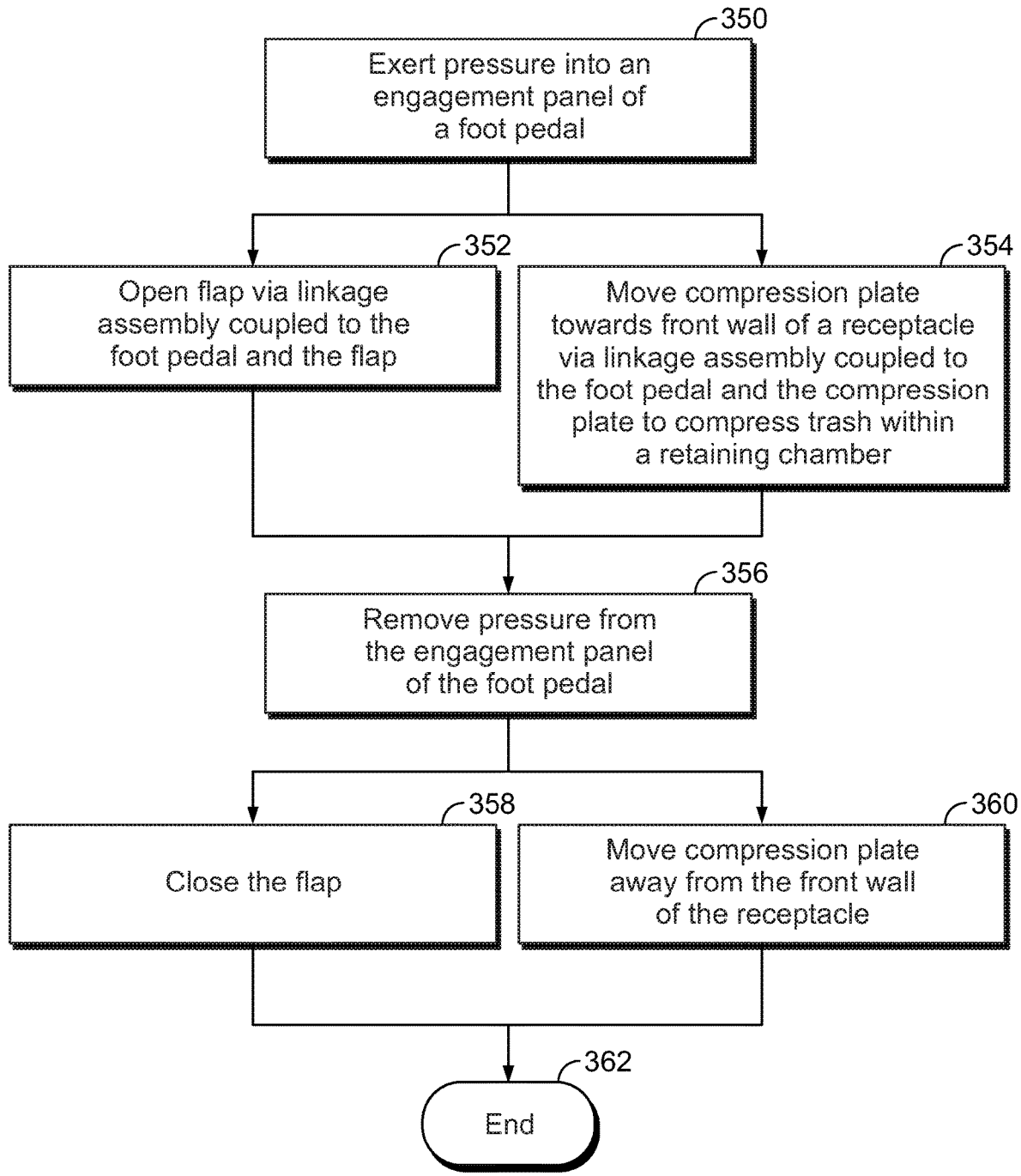
FIG. 9 illustrates a flow chart of a method of compacting trash, according to an embodiment of the present disclosure.

FIG. 9 illustrates a flow chart of a method of compacting trash, according to an embodiment of the present disclosure. Referring to FIGS. 1-9, the method begins at 350, at which an individual exerts pressure into a top surface of the engagement panel 120 of the foot pedal 104, such as by stepping onto the engagement panel 120. In response, at 352, the flap 106 is opened via the linkage assembly 110 that is coupled to the foot pedal 104 and the flap 106. At 354, the compression plate 108 is moved towards the front wall 114 of the receptacle 102 via the linkage assembly 110 that is coupled to the foot pedal 104 and the compression plate 108 to compact trash within the retaining chamber 119. Steps 352 and 354 may simultaneously occur.

Next, at 356, after an individual places trash into the receptacle via the open flap 106, the individual removes pressure from the engagement panel 120 of the foot pedal 104, such as by removing a foot from the engagement panel 120. As such, the flap 106 closes at 358, and the compression plate 108 recedes away from the front wall 114 of the receptacle at 410 at 360. Steps 358 and 360 may occur at the same time. The method then ends at 362.

Figure 10:
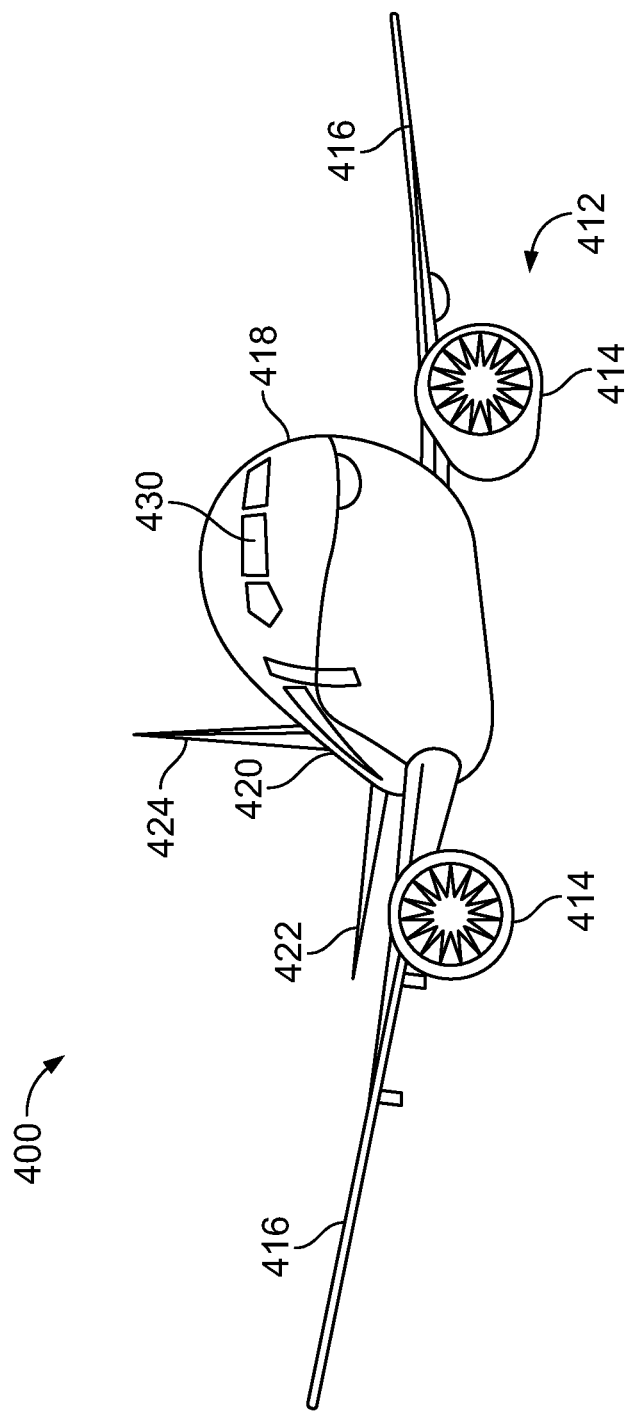
FIG. 10 illustrates a perspective front view of an aircraft, according to an embodiment of the present disclosure.

FIG. 10 illustrates a perspective front view of an aircraft 400, according to an embodiment of the present disclosure. The aircraft 400 includes a propulsion system 412 that may include two turbofan engines 414, for example. Optionally, the propulsion system 412 may include more engines 414 than shown. The engines 414 are carried by wings 416 of the aircraft 400. In other embodiments, the engines 414 may be carried by a fuselage 418 and/or an empennage 420. The empennage 420 may also support horizontal stabilizers 422 and a vertical stabilizer 424.

The fuselage 418 of the aircraft 400 defines an internal cabin 430, which may include a cockpit, one or more work sections (for example, galleys, personnel carry-on baggage areas, and the like), one or more passenger sections (for example, first class, business class, and coach sections), one or more lavatories, and/or the like. The internal cabin 430 includes one or more chambers, such as lavatories and galleys, for example. One or more of the chambers may include a trash compactor system 100, such as shown and described with respect to FIGS. 1-9.

Alternatively, instead of an aircraft, embodiments of the present disclosure may be used with various other vehicles, such as automobiles, buses, locomotives and train cars, watercraft, and the like. Further, embodiments of the present disclosure may be used with respect to fixed structures, such as commercial and residential buildings.

Figure 11:
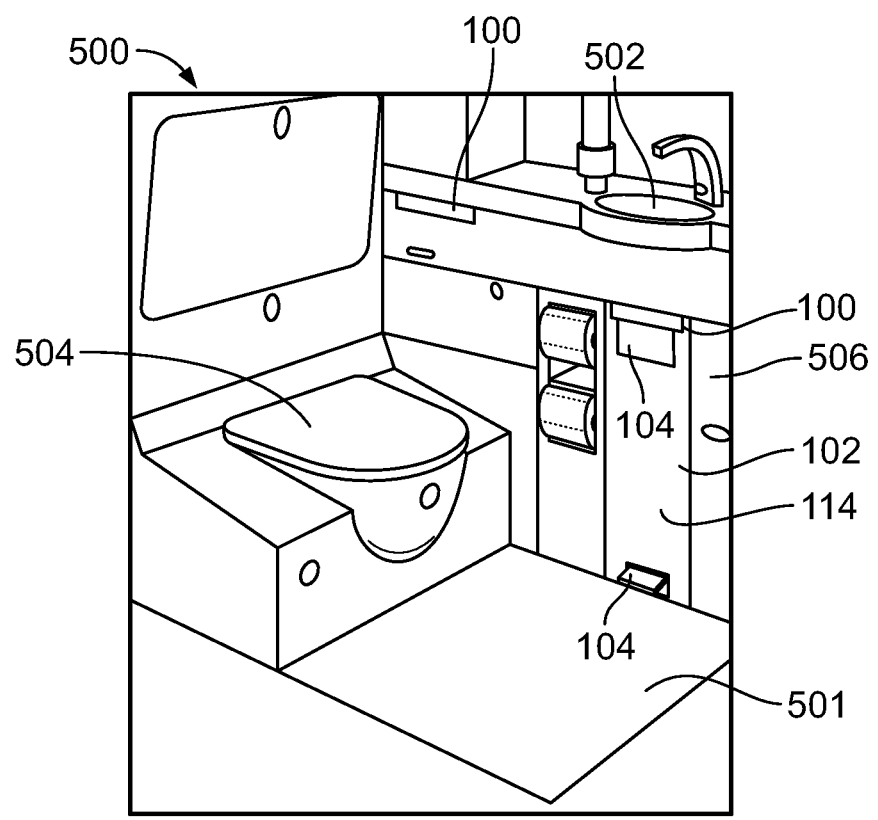
FIG. 11 illustrates a perspective internal view of a lavatory, according to an embodiment of the present disclosure.

FIG. 11 illustrates a perspective internal view of a lavatory 500, according to an embodiment of the present disclosure. The lavatory 500 is an example of an enclosed space or chamber, such as within the internal cabin of the aircraft 400, shown in FIG. 10. The lavatory 500 may be onboard an aircraft, as described above. Optionally, the lavatory 500 may be onboard various other vehicles. In other embodiments, the lavatory 500 may be within a fixed structure, such as a commercial or residential building.

The lavatory 500 includes a base floor 501 that supports a toilet 504, cabinets 506, and a sink 502. A trash compactor system 100 is located within the lavatory 500, such as underneath or otherwise proximate to the sink 502. As described above, the trash compactor system 100 is light, compact, and particularly well-suited to fit within the confined, limited space of an aircraft lavatory.

As described herein, embodiments of the present disclosure provide compact and efficient trash compactor systems and methods. Further, embodiments of the present disclosure provide a trash compactor system that may be employed within a lavatory of a commercial aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A trash compactor system, comprising:
   a receptacle defining a retaining chamber that is configured to receive and retain trash;
   a compaction plate moveably secured within the retaining chamber, wherein the compaction plate comprises a top end pivotally connected to a top of the receptacle and a bottom end proximate of a bottom of the receptacle;
   a flap covering an opening into the retaining chamber; and
   a foot pedal operatively coupled to the compaction plate and the flap, wherein engagement of the foot pedal moves the compaction plate within the retaining chamber to compact the trash retained within the retaining chamber, wherein the engagement of the foot pedal moves the flap into an open position that exposes the opening, and
   wherein the compaction plate moves from a rear towards a front of the receptacle to compact the trash retained within the retaining chamber.

2. The trash compactor system of claim 1, further comprising a linkage assembly that operatively couples the foot pedal to the compaction plate.

3. The trash compactor system of claim 1, further comprising a linkage assembly that operatively couples the foot pedal to the flap.

4. The trash compactor system of claim 1, wherein the engagement of the foot pedal causes simultaneous motion of the compaction plate and the flap.

5. The trash compactor system of claim 1, wherein the receptacle comprises a front wall and lateral walls upwardly extending from a base, wherein the retaining chamber is defined between the base, the front wall, and the lateral walls.

6. The trash compactor system of claim 1, wherein the compaction plate comprises a bottom end and a top end, wherein the compaction plate is inwardly canted from the bottom end to the top end towards a front of the receptacle.

7. The trash compactor system of claim 1, wherein the compaction plate is manually powered via the foot pedal, and wherein a single press of the foot pedal causes the compaction plate to compact the trash within the retaining chamber.

8. The trash compactor system of claim 1, wherein the trash compactor system is devoid of a motor.

9. A trash compacting method, comprising:
   defining a retaining chamber that is configured to receive and retain trash within a receptacle;
   covering an opening into the retaining chamber with a flap;
   moveably securing a compaction plate within the retaining chamber, wherein the compaction plate comprises a top end pivotally connected to a top of the receptacle and a bottom end proximate of a bottom of the receptacle;
   operatively coupling a foot pedal to the compaction plate;
   operatively coupling the foot pedal to the flap;
   moving the compaction plate within the retaining chamber via engagement of the foot pedal, wherein the moving the compaction plate operation comprises moving the compaction plate from a rear towards a front of the receptacle to compact the trash retained within the retaining chamber;
   moving the flap into an open position that exposes the opening via the engagement of the foot pedal; and
   compacting the trash retained within the retaining chamber through the moving operation.

10. The trash compaction method of claim 9, wherein the operatively coupling operation comprises operatively coupling the foot pedal to the compaction plate via a linkage assembly.

11. The trash compaction method of claim 9, wherein the operatively coupling the foot pedal to the flap operation comprises operatively coupling the foot pedal to the flap via a linkage assembly.

12. The trash compaction method of claim 9, further comprising inwardly canting the compaction plate from a bottom end to a top end towards a front of the receptacle.

13. The trash compaction method of claim 9, wherein the moving and compacting operations are manually powered through a single press of the foot pedal.

14. The trash compaction method system of claim 9, devoid of electrical power.

15. A vehicle comprising:
   an internal cabin;
   a lavatory within the internal cabin; and
   a trash compactor system within the lavatory, the trash compactor system, comprising:
     a receptacle defining a retaining chamber that is configured to receive and retain trash;
     a compaction plate moveably secured within the retaining chamber, wherein the compaction plate comprises a bottom end and a top end, wherein the compaction plate is inwardly canted from the bottom end to the top end towards a front of the receptacle;

a foot pedal operatively coupled to the compaction plate, wherein engagement of the foot pedal moves the compaction plate within the retaining chamber to compact the trash retained within the retaining chamber;

a flap covering an opening into the retaining chamber, wherein the foot pedal is also operatively coupled to the flap, wherein the engagement of the foot pedal moves the flap into an open position that exposes the opening; and a linkage assembly that operatively couples the foot pedal to the compaction plate and the flap, wherein the engagement of the foot pedal causes simultaneous motion of the compaction plate and the flap, wherein the compaction plate moves from a rear towards the front of the receptacle to compact the trash retained within the retaining chamber, wherein the compaction plate and the flap are manually powered via a single press of the foot pedal.

16. The vehicle of claim 15, wherein the trash compactor system is devoid of a motor.

17. The trash compactor system of claim 1, wherein the compaction plate comprises a top end proximate to a top of the retaining chamber, and a bottom end proximate to a bottom of the retaining chamber.

18. The trash compacting method of claim 9, further comprising:
   disposing a top end of the compaction plate proximate to a top of the retaining chamber; and
   disposing a bottom end of the compaction plate proximate to a bottom of the retaining chamber.

19. The trash compactor system of claim 1,
   wherein the compaction plate moves the bottom end from the rear towards the front of the receptacle to compact the trash retained within the retaining chamber against the front of the receptacle.

20. The trash compacting method of claim 9, wherein the moving the compaction plate operation comprises moving the bottom end of the compaction plate from the rear towards the front of the receptacle to compact the trash retained within the retaining chamber, and wherein the compacting operation comprises compacting the trash retained within the retaining chamber against the front of the receptacle through the moving operation.

* * * * *